(12) United States Patent
Sampath et al.

(10) Patent No.: US 8,665,767 B2
(45) Date of Patent: Mar. 4, 2014

(54) METHOD AND APPARATUS FOR MULTIPLE-USER COMMUNICATION IN A CLIENT INITIATED COMMUNICATION TRANSMISSION SCHEME

(75) Inventors: Hemanth Sampath, San Diego, CA (US); Simone Merlin, Breukelen (NL); Santosh P. Abraham, San Diego, CA (US); Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 599 days.

(21) Appl. No.: 12/607,542

(22) Filed: Oct. 28, 2009

(65) Prior Publication Data
US 2011/0051647 A1 Mar. 3, 2011

Related U.S. Application Data

(60) Provisional application No. 61/236,852, filed on Aug. 25, 2009.

(51) Int. Cl.
*H04W 72/04* (2009.01)
*H04H 20/71* (2008.01)
*H04W 4/00* (2009.01)

(52) U.S. Cl.
USPC ............ 370/312; 370/329; 370/331; 713/169

(58) Field of Classification Search
USPC ........................... 370/200–488; 713/163, 169
See application file for complete search history.

(56) References Cited

U.S. PATENT DOCUMENTS

| | | | |
|---|---|---|---|
| 5,956,644 A * | 9/1999 | Miller et al. | 455/453 |
| 2001/0053180 A1 | 12/2001 | Asia et al. | |
| 2004/0107281 A1 * | 6/2004 | Bose et al. | 709/226 |
| 2004/0240593 A1 | 12/2004 | Su | |
| 2005/0128953 A1 | 6/2005 | Wallace et al. | |
| 2006/0093067 A1 | 5/2006 | Jalali et al. | |
| 2007/0211822 A1 | 9/2007 | Olesen et al. | |
| 2007/0298742 A1 | 12/2007 | Ketchum et al. | |
| 2008/0108379 A1 | 5/2008 | Cho et al. | |
| 2009/0067452 A1 | 3/2009 | Filipovic et al. | |
| 2009/0310556 A1 | 12/2009 | Ishii et al. | |

(Continued)

FOREIGN PATENT DOCUMENTS

| | | |
|---|---|---|
| EP | 2124362 A1 | 11/2009 |
| JP | 2003052079 A | 2/2003 |

(Continued)

OTHER PUBLICATIONS

Sheng Zhou, et al., "An Uplink Medium Access Protocol with SDMA Support for Multiple-Antenna WLANs" Wireless Communications and Networking Conference, 2008. WCNC 2008. IEEE, IEEE, Piscataway, NJ, USA, Mar. 31, 2008, pp. 1809-1814, XP031243907.

(Continued)

*Primary Examiner* — Afsar M. Qureshi
(74) *Attorney, Agent, or Firm* — Steven Thiel

(57) ABSTRACT

An apparatus is disclosed having a receiver configured to receive a request to transmit data from a wireless node in a plurality of wireless nodes; and a transmitter configured to transmit a multi-cast message to a set of wireless nodes in the plurality of wireless nodes to permit data transmission. A method for wireless communications is also disclosed.

57 Claims, 11 Drawing Sheets

(56) References Cited

U.S. PATENT DOCUMENTS

| | | |
|---|---|---|
| 2009/0316641 A1 | 12/2009 | Yamada et al. |
| 2010/0329236 A1 | 12/2010 | Sampath et al. |
| 2011/0150004 A1* | 6/2011 | Denteneer et al. ............ 370/476 |
| 2012/0002634 A1* | 1/2012 | Seok ............................. 370/329 |

FOREIGN PATENT DOCUMENTS

| | | |
|---|---|---|
| JP | 2005244840 A | 9/2005 |
| JP | 2007502074 A | 2/2007 |
| JP | 2007208522 A | 8/2007 |
| JP | 2008109623 A | 5/2008 |
| JP | 2009529253 A | 8/2009 |
| JP | 2009246480 A | 10/2009 |
| JP | 2010530171 A | 9/2010 |
| KR | 20070107073 A | 11/2007 |
| KR | 20070119936 A | 12/2007 |
| KR | 20080089465 A | 10/2008 |
| WO | WO2005015844 | 2/2005 |
| WO | 2007100224 A2 | 9/2007 |
| WO | 2008084612 A1 | 7/2008 |
| WO | 2008153078 A1 | 12/2008 |
| WO | 2008153365 A2 | 12/2008 |
| WO | WO2009027931 A2 | 3/2009 |

OTHER PUBLICATIONS

Zheng, et al., "Multipacket Reception in Wireless Local Area Networks" Communications, 2006. ICC '06. IEEE International Conference on, IEEE, PI, Jun. 1, 2006, pp. 3670-3675, XP031025888.

International Search Report and Written Opinion—PCT/US2010/046708, International Searching Authority—European Patent Office, Nov. 4, 2010.

NTT DoCoMo et al: "Uplink synchronization" 3GPP Draft; R2-062165, 3rd Generation Partnership Project (3GPP), Mobile Competence Centre; 650, Route des Lucioles; F-06921 Sophia-Antipolis Cedex; France, vol. RAN WG2, No. Tallinn; Aug. 23, 2006, XP050131779 [retrieved on Aug. 23, 2006].

* cited by examiner

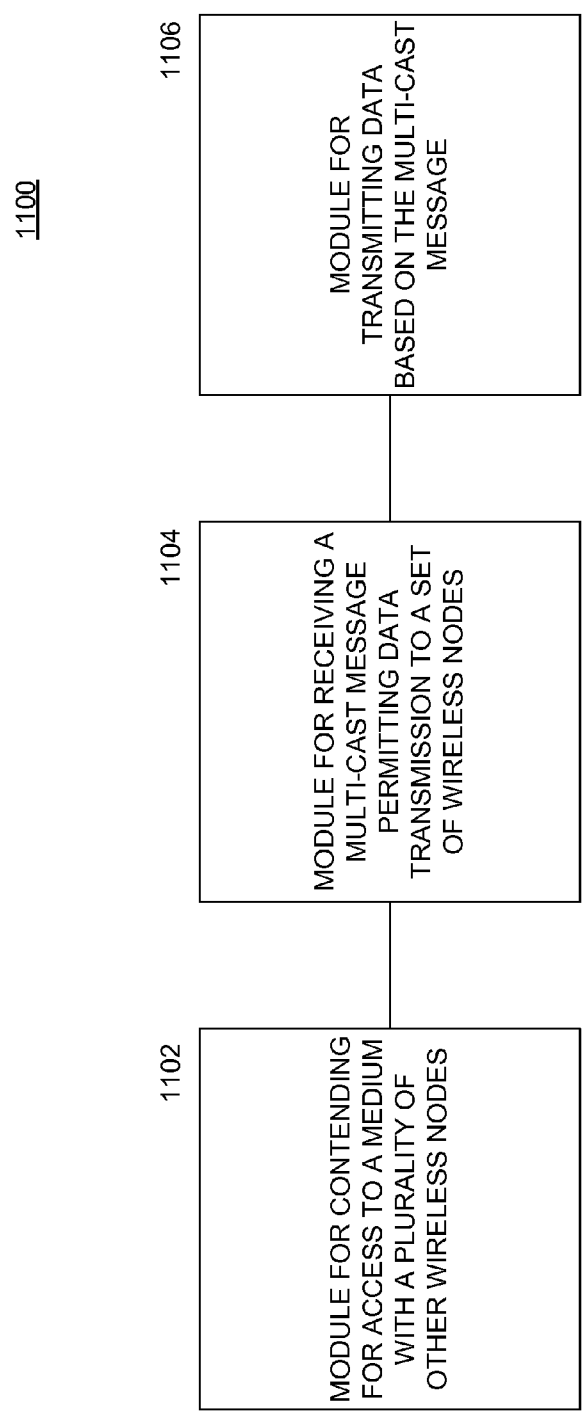

METHOD AND APPARATUS FOR MULTIPLE-USER COMMUNICATION IN A CLIENT INITIATED COMMUNICATION TRANSMISSION SCHEME

CROSS-REFERENCE TO RELATED APPLICATIONS

Claim of Priority Under 35 U.S.C. §119

The present application for patent claims priority to Provisional Application No. 61/236,852, entitled "METHOD AND APPARATUS FOR MULTIPLE-USER COMMUNICATION IN A CLIENT INITIATED COMMUNICATION TRANSMISSION SCHEME" filed Aug. 25, 2009, and assigned to the assignee hereof and hereby expressly incorporated by reference herein.

BACKGROUND

I. Field

The following description relates generally to communication systems, and more particularly to a method and apparatus for multiple-user communication in a client-initiated communication transmission scheme.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In wireless communications systems, medium access control (MAC) protocols are designed to operate to exploit several dimensions of freedom offered by the air link medium. The most commonly exploited dimensions of freedom are time and frequency. For example, in the IEEE 802.11 MAC protocol, the "time" dimension of freedom is exploited through the CSMA (Carrier Sense Multiple Access). The CSMA protocol attempts to ensure that no more than one transmission occurs during a period of potential high interference. Similarly, the "frequency" dimension of freedom can be exploited by using different frequency channels.

Recent developments have led to space as a dimension being a viable option to be used to increase, or at least more efficiently use, existing capacity. Spatial Division Multiple Access (SDMA) can be used for improving utilization of the air link by scheduling multiple terminals for simultaneous transmission and reception. Data is sent to each of the terminals using spatial streams. For example, with SDMA, a transmitter forms orthogonal streams to individual receivers. Such orthogonal streams can be formed because the transmitter has several antennas and the transmit/receive channel consists of several paths. Receivers may also have one or more antennas (MIMO, SIMO). For this example, it is assumed that the transmitter is an access point (AP) and the receivers are stations (STAs). The streams are formed such that a stream targeted at STA-B, for example, is seen as low power interference at STA-C, STA-D, . . . , etc., and this will not cause significant interference and most likely be ignored. In order to form these orthogonal streams, the AP needs to have channel state information (CSI) from each of the receiving STAs. Although CSI can be measured and communicated in several ways, thereby adding complexity, the use of CSI will optimize the configuration of SDMA streams.

Additional complexities arise when MIMO is applied to multi-user (MU) systems. For example, typically, the AP controls the uplink (UL) communication process. However, in certain configurations, the uplink scheduling approach still requires that STAs contend with the AP for channel access. In other words, the AP will act as an additional STA trying to gain access to the transmission medium, thereby affecting all STAs attempting to gain access. Further, as the STAs rely on the AP for scheduling of future UL transmissions, the scheduling scheme does not always work well with certain types of data traffic, such as bursty data traffic.

Consequently, it would be desirable to address one or more of the deficiencies described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method for wireless communications includes receiving a request to transmit data from a wireless node in a plurality of wireless nodes; and transmitting a multi-cast message to a set of wireless nodes in the plurality of wireless nodes to permit data transmission In another aspect, an apparatus for wireless communications is provided that includes a processing system configured to receive a request to transmit data from a wireless node in a plurality of wireless nodes; and transmit a multi-cast message to a set of wireless nodes in the plurality of wireless nodes to permit data transmission.

In yet another aspect, an apparatus for wireless communications is provided that includes means for receiving a request to transmit data from a wireless node in a plurality of wireless nodes; and means for transmitting a multi-cast message to a set of wireless nodes in the plurality of wireless nodes to permit data transmission.

In yet another aspect, a computer-program product for wireless communications is provided that includes a machine-readable medium including instructions executable to receive a request to transmit data from a wireless node in a plurality of wireless nodes; and transmit a multi-cast message to a set of wireless nodes in the plurality of wireless nodes to permit data transmission.

In yet another aspect, an access point is provided that includes one or more antennas; a transmitter configured to a receiver configured to receive a request to transmit data from a wireless node in a plurality of wireless nodes via the one or more antennas; and a transmitter configured to transmit a multi-cast message to other wireless nodes in the plurality of wireless nodes to permit data transmission.

In yet another aspect, a method for wireless communications is provided that includes contending for access to a medium with a plurality of other wireless nodes; receiving a multi-cast message permitting data transmission to a set of wireless nodes; and transmitting data based on the multi-cast message.

In yet another aspect, an apparatus for wireless communications is provided that includes a processing system configured to contend for access to a medium with a plurality of other wireless nodes; receive a multi-cast message permitting data transmission to a set of wireless nodes; and transmit data based on the multi-cast message.

In yet another aspect, an apparatus for wireless communications is provided that includes means for contending for access to a medium with a plurality of other wireless nodes; means for receiving a multi-cast message permitting data transmission to a set of wireless nodes; and means for transmitting data based on the multi-cast message.

In yet another aspect, a computer-program product for wireless communications is provided that includes a machine-readable medium including instructions executable to receive a request to transmit data from a wireless node in a plurality of wireless nodes; and transmit a multi-cast message to a set of wireless nodes in the plurality of wireless nodes to permit data transmission.

In yet another aspect, a station is provided that includes an antenna; a processor, coupled to the antenna, configured to contend for access to a medium with a plurality of other wireless nodes using the antenna; a receiver configured to receive a multi-cast message permitting data transmission to a set of wireless nodes; and a transmitter configured to transmit data based on the multi-cast message.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents

BRIEF DESCRIPTION OF THE DRAWINGS

In FIG. 1 is a prior art timing diagram illustrating the operation of a traditional Access Point (AP)-initiated UL SDMA frame sequence;

FIG. 11 is a block diagram illustrating the functionality of a STA apparatus for implementing a client-initiated UL scheme for a plurality of STAs in accordance with one aspect of the disclosure.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Figure 1:
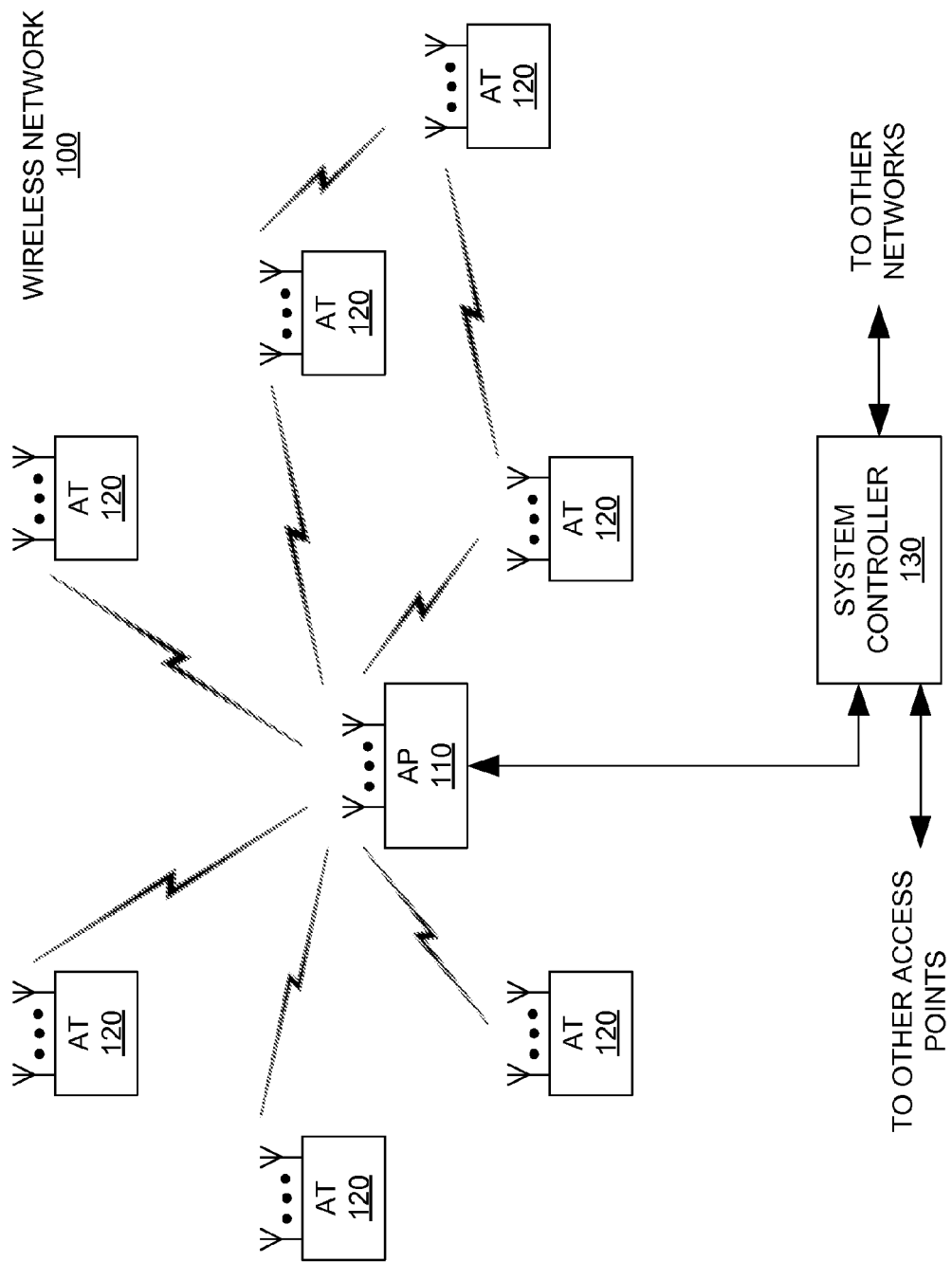
FIG. 1 is a diagram of a wireless communications network configured in accordance with an aspect of the disclosure.

Several aspects of a wireless network will now be presented with reference to FIG. 1. The wireless network, which is also referred to herein as a basic service set (BSS) 100 is shown with several wireless nodes, generally designated as an access point 110 and a plurality of access terminals or stations (STAs) 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, a wireless node, an access terminal acting as an access point, or some other suitable terminology. An access terminal may be referred to as a user terminal, a mobile station, a subscriber station, a station, a wireless device, a terminal, a node, a wireless node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream. It should be noted that although the term "precoding" is used herein, in general, the term "coding" may also be used to encompass the process of precoding, encoding, decoding and/or postcoding a data stream.

One or more access terminals 120 may be equipped with multiple antennas to enable certain functionality. With this configuration, for example, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

Figure 2:
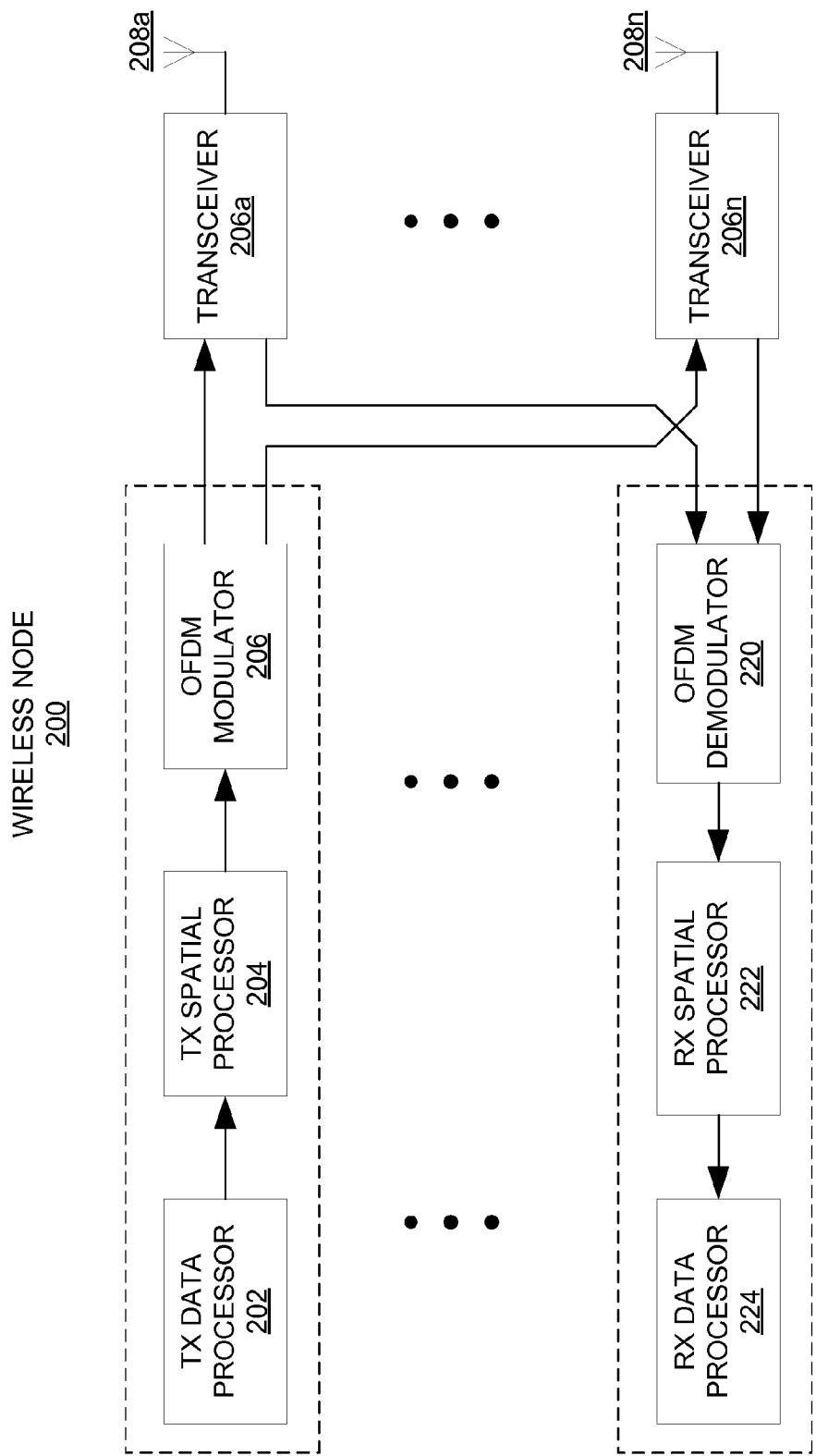
FIG. 2 is a wireless node that includes a front end processing system in a wireless node in the wireless communications network of FIG. 1.

FIG. 2 is a conceptual block diagram illustrating an example of the signal processing functions of the PHY layer. In a transmit mode, a TX data processor 202 may be used to receive data from the MAC layer and encode (e.g., Turbo code) the data to facilitate Forward Error Correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator 204 splits the modulation symbols into parallel streams. Each stream is then mapped to an OFDM subcarrier and then combined using an Inverse Fast Fourier Transform (IFFT) to produce a TX spatial processor 204 that performs spatial processing of the modulation symbols. This may be accomplished by spatial precoding the modulation symbols before providing them to an OFDM modulator 206.

The OFDM modulator 206 splits the modulation symbols into parallel streams. Each stream is then mapped to an OFDM subcarrier and then combined together using an Inverse Fast Fourier Transform (IFFT) to produce a time domain OFDM stream. Each spatially precoded OFDM stream is then provided to a different antenna 210a-210n via a respective transceiver 208a-208n. Each transceiver 208a-208n modulates an RF carrier with a respective precoded stream for transmission over the wireless channel.

In a receive mode, each transceiver 208a-208n receives a signal through its respective antenna 210a-210n. Each transceiver 208a-208n may be used to recover the information modulated onto an RF carrier and provide the information to an OFDM demodulator 210.

The RX spatial processor 210 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 210.20.

In wireless nodes implementing OFDM, the stream (or combined stream) from the transceiver 208a-208n is provided to an OFDM demodulator 220. The OFDM demodulator 220 converts the stream (or combined stream) from time-domain to the frequency domain using a Fast Fourier Transform (FFT). The frequency domain signal comprises a separate stream for each subcarrier of the OFDM signal. The OFDM demodulator 220 recovers the data (i.e., modulation symbols) carried on each subcarrier and multiplexes the data into a stream of modulation symbols before sending the stream to a RX spatial processor 222.

The RX spatial processor 222 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 222.

A RX data processor 224 may be used to translate the modulation symbols back to the correct point in the signal constellation. Because of noise and other disturbances in the wireless channel, the modulation symbols may not correspond to an exact location of a point in the original signal constellation. The RX data processor 224 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 224 then uses the sequence of code symbol LLRs in order to decode the data that was originally transmitted before providing the data to the MAC layer.

Figure 3:
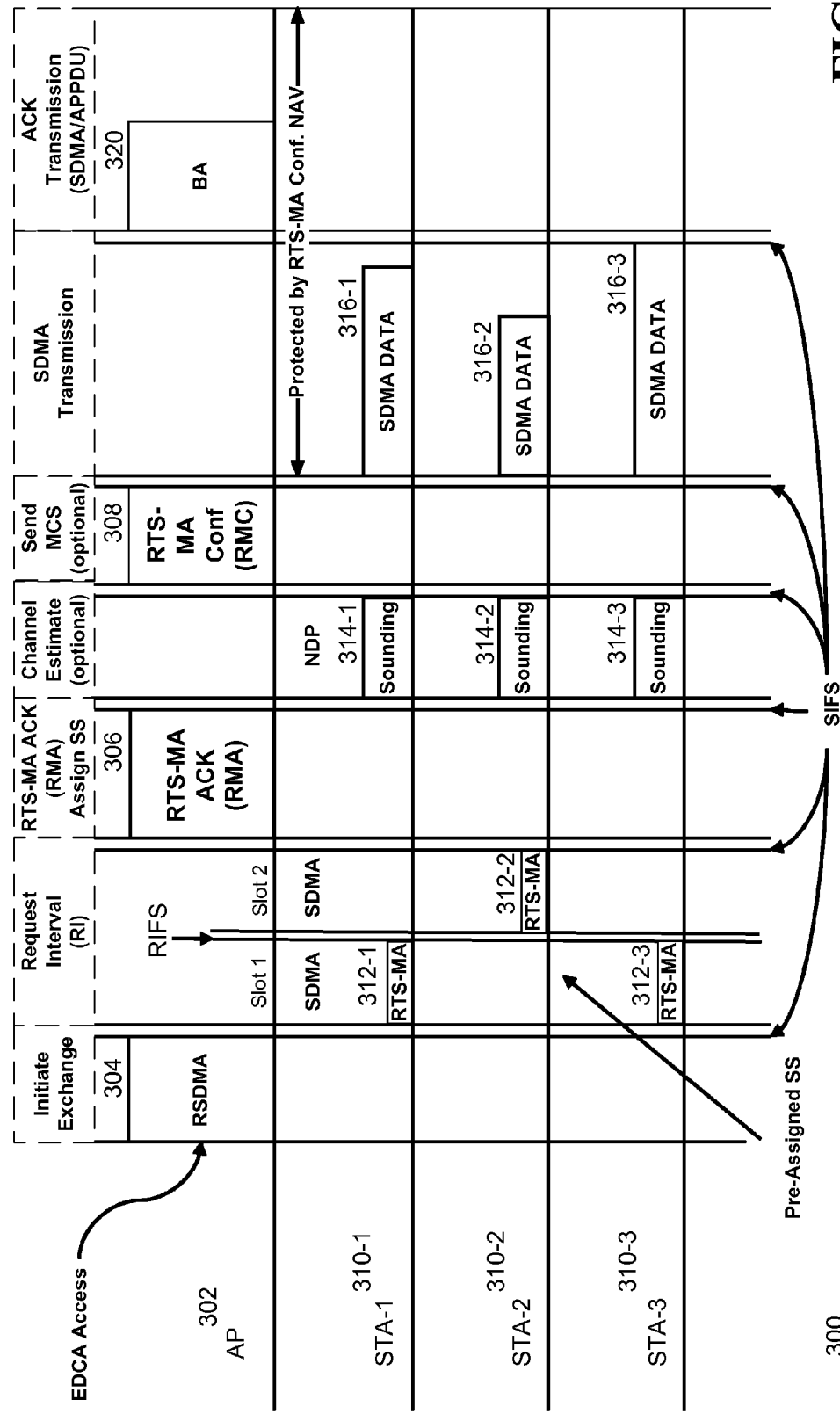

FIG. 3 illustrates a timing diagram 300 that illustrates a traditional sequence for AP-initiated uplink SDMA transmission by an AP 302 with a plurality of STAs 310-1 to 310-3, where:

1. The AP 302 gains access to the medium using enhanced distributed channel access (EDCA). Access is provided based on a priority depending on a UL traffic Access category (AC) from the plurality of STAs 310-1 to 310-3.

2. The AP 302 sends out a request SDMA (RSDMA) message 304, requesting clients such as the plurality of STAs 310-1 to 310-3 to send an UL request to send-Multiple Access (RTS-MA) message. UL RTS-MA messages are transmitted using pre-assigned time-slots and spatial streams (SS), where the assignment is performed by the AP 302.

3. The plurality of STAs 310-1 to 310-3 respond with respective RTS-MA messages 312-1 to 312-3. Each RTS-MA message contains UL traffic AC, an EDCA backoff counter value and a packet size.

4. The AP 302 may optionally send an RTS-MA-ACK (RMA) message 306, acknowledging the RTS-MA messages 312-1 to 312-3 and requesting sounding for UL SDMA modulation and coding scheme (MCS) calculation purposes.

5. The AP 302 then sends an RTS-MA Confirmation (RMC) message 308 with SS, MCS and any power offset values required for UL SDMA for selected clients. These clients are selected to preserve their EDCA priorities (backoff counter value and AC). The RMC message 308 also reserves the medium for a time period needed to perform a transmission operation, referred to as a TxOP duration. The TxOP duration can be based on longest packet size requested by the selected clients.

6. Clients then send UL SDMA packets; illustrated as SDMA data transmissions 316-1 to 316-3, using the SS, MCS and power offset values as suggested by the AP 302.

7. Once the AP 302 has successfully received the UL SDMA packets, the AP 302 responds with a Block ACK (BA) message 320 to acknowledge the transmission from the clients.

8. After a successful transmission of the UL SDMA packets, the clients may re-initialize their backoff counters for EDCA access. The clients may prefer to not use EDCA access for UL traffic and rely on scheduled RSDMA or RTS-MA-Confirmation messages for future UL transmissions.

The above-described AP initiated UL-SDMA scheme can encounter issues under the following scenarios:

1. If the clients re-initialize their backoff counters for EDCA access after UL-SDMA transmission, the AP may still contend for the medium on behalf of other clients that needs to send UL traffic even if the AP has no traffic to send. This results in the AP also competing with these clients for medium access. In other words, the AP will act as a "virtual STA". With overlapping basic services sets (OBSS), the number of these "virtual STAs" will increase in the network and lead to an increased number of collisions.

2. If the clients rely purely on scheduled RSDMA or RMC messages from the AP for scheduling future UL transmission:

a. Scheduled access works well for fixed rate traffic such as video or voice over Internet Protocol (VoIP) traffic, but does not extend well to bursty data traffic;

b. In the presence of OBSS with several APs, the reliance on AP scheduling messages by the clients will lead to increased collisions of scheduled RSDMAs, although this can be mitigated to some extent using random backoffs.

c. As the AP is solely responsible for scheduling UL SDMA transmissions, the AP design will need to be more complicated as the AP is more burdened.

Figure 4:
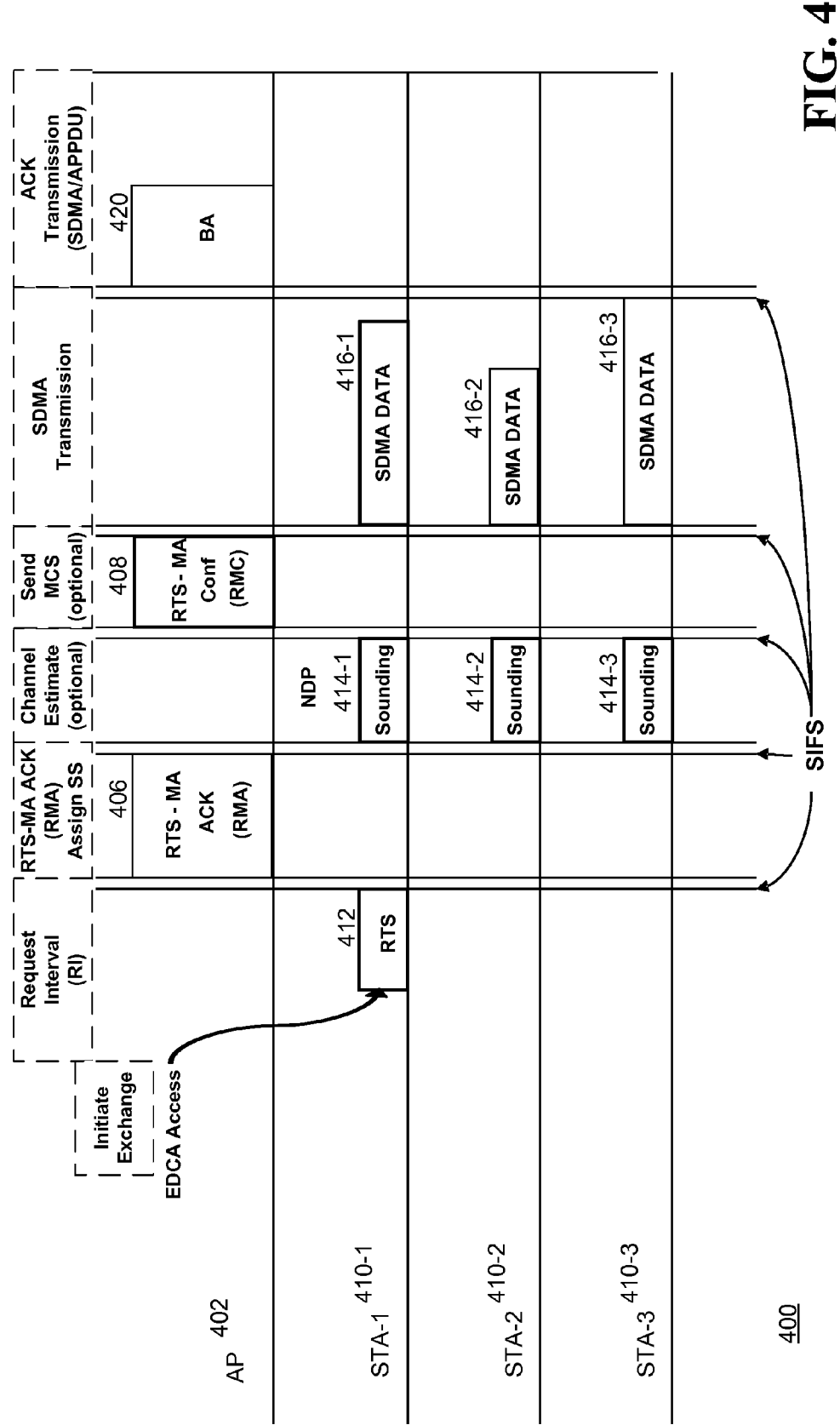
FIG. 4 is a timing diagram illustrating the operation of a station (STA)/client-initiated UL SDMA scheme configured in accordance with one aspect of the disclosure.
Figure 5:
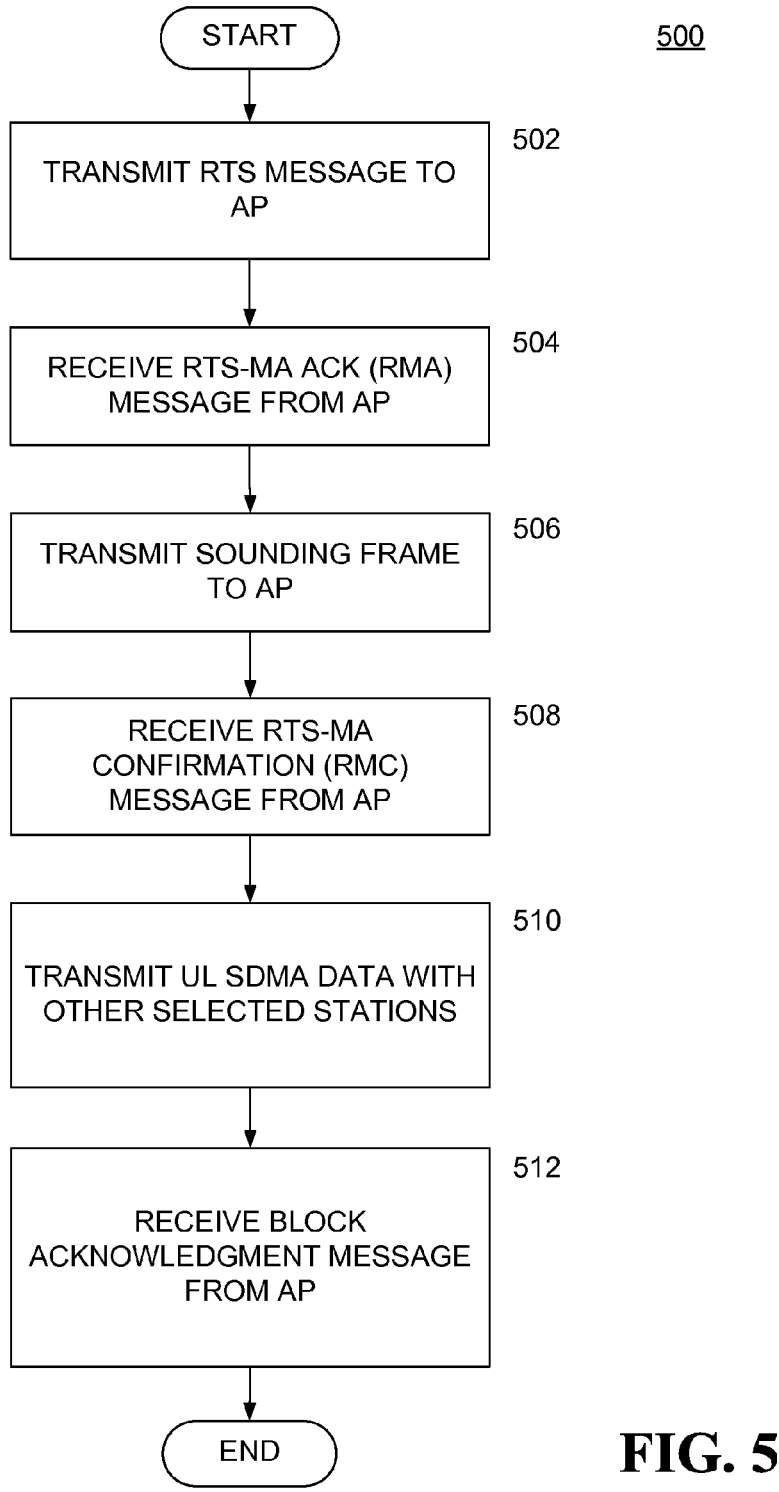
FIG. 5 is a flow diagram illustrating the operation of the STA/client-initiated UL SDMA scheme of FIG. 4 configured in accordance with one aspect of the disclosure.

A proposed client SDMA uplink reservation protocol between an AP 402 and a plurality of STA-1 410-1 to STA-3 410-3 will be described with reference to a timing diagram 400 as illustrated in FIG. 4, and further with reference to a client UL SDMA process 500 as illustrated by FIG. 5.

In step 502, a STA-1 410-1 gains access to the medium using EDCA and sends an RTS message 712 to the AP 402.

In step 504, in one aspect of the disclosure, the AP 402 replies back with an RMA message 406 that acts as a CTS message for the STA-1 410-1 and reserves the medium for the STA-1 410-1. A training request message (TRM) is also sent to selected STAs and the SS for selected STAs are allocated for sending sounding information using UL-SDMA.

In step 506, in one aspect of the disclosure, the STA-1 410-1 will transmit a sounding packet 414-1 in response to the RMA message 406 from the AP 402, where a null data packet (NDP), as further described below, is used as a sounding frame or packet. The use of sounding packets allows an AP to compute an MCS for each UL-SDMA STA. The selected STAs, which are the STA-1 410-2 and the STA-1 410-3, will also transmit sounding information in addition to the STA-1 410-1.

In step 508, the AP 402 replies with an RMC message 408 that acts as a CTS to the STA-1 410-1 and reserves the medium for a TxOP specified by the STA-1 410-1. The AP 402 also allocates SS, MCS and Power offset values, the assignment of which are optional, for the selected STAs 410-2 and 410-3 to send UL-SDMA traffic within the TxOP. For example, the STA-2 410-2 and the STA-3 410-3 can transmit data, if any, to the AP 402 in addition to the STA-1 410-1. In one aspect of this disclosure, the AP 402 may choose the appropriate STAs for UL-SDMA, based on the TxOP Duration Requested, which is the requested duration of the transmission operation. In another aspect of the disclosure, the AP 402 can choose the appropriate STAs based Queue Size subfield in a prior QoS data frame sent to the AP 402, which indicates the size of the queue remaining at a particular STA.

In step 510, in one aspect of the disclosure, the STA-1 410-1 will transmit UL SDMA data 416-1 in response to the RMC message 408 from the AP 402. In addition, the selected STAs, the STA-2 410-2 and the STA-3 410-3, may also respond to the RMC message 408 by transmitting UL SDMA traffic if their packet lengths fit within the TxOP. Otherwise, a subset of the selected STAs may choose to forgo sending UL SDMA traffic in this TxOP. The STAs choosing not to send UL SDMA during the TxOP because their packets are too large to transmit completely during the TxOP will avoid fragmentation of packets and having to re-encrypt on the fly.

In step 512, once the AP 402 is able to verify that it has received the data transmitted by the selected STAs, the AP 402 replies with a BA message 420. In one aspect of the disclosure, the BA message 420 can be transmitted using DL SDMA or APPDU.

Figure 6:
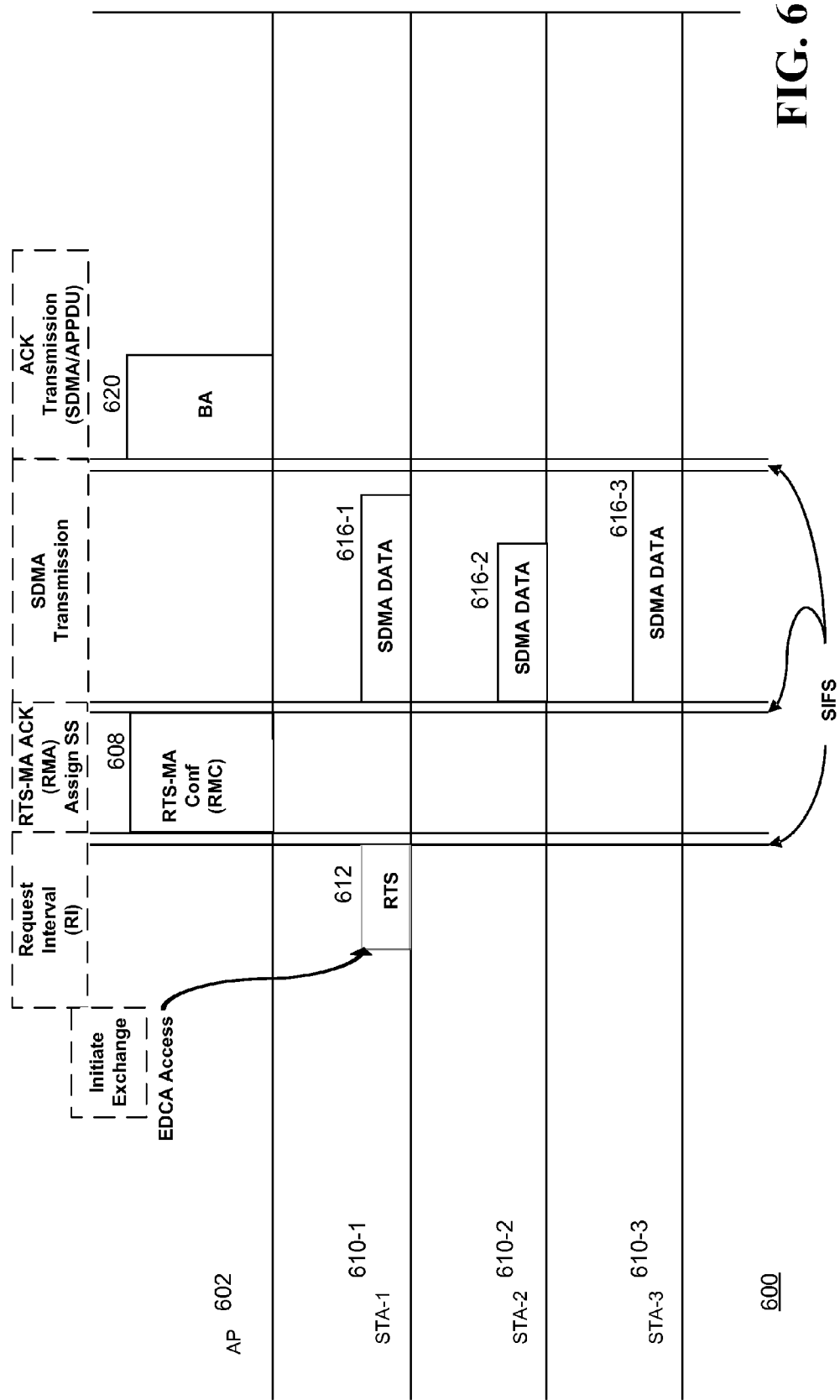
FIG. 6 is a timing diagram illustrating the operation of a STA/client-initiated UL SDMA scheme configured in accordance with another aspect of the disclosure.
Figure 7:
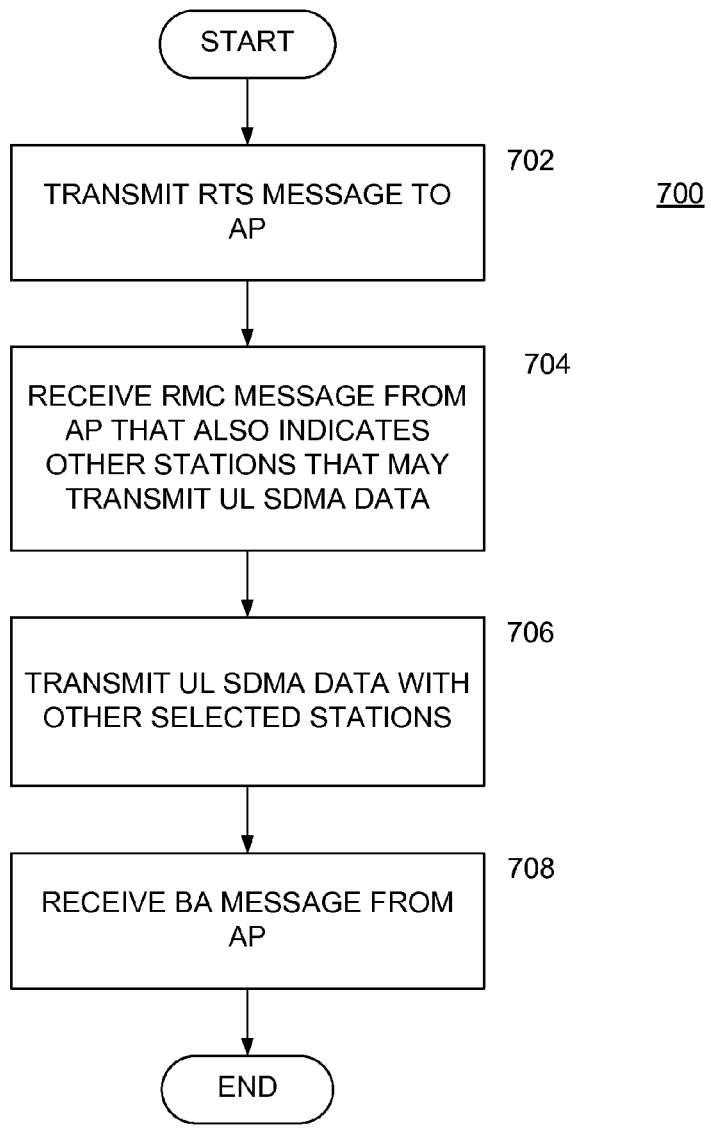
FIG. 7 is a flow diagram illustrating the operation of the STA/client-initiated UL SDMA scheme of FIG. 6 configured in accordance with one aspect of the disclosure.

FIG. 6 illustrates a simplified UL-SDMA scheme 600 that does not include a sounding operation with a simplified UL- SDMA process 700 as illustrated in FIG. 7. In one aspect of the disclosure, in step 702, a STA-1 610-1 transmits an RTS message 612 to an AP 602.

In step 704, the AP 602 will transmit an RMC message 608, where a selected set of STAs, including a STA-2 610-2 and a STA-3 610-3 in addition to the STA-1 610-1, are chosen to be able to transmit UL SDMA data to the AP 602.

In step 706, the STA-1 610-1 transmits UL SDMA data 616-1 to the AP 602. In addition, the STA-2 610-2 and the STA-3 610-3, which are STAs in the selected set of STAs, transmit UL SDMA data 616-2 and 616-3, respectively, to the AP 602.

In step 704, a BA message 620 is transmitted by the AP 602 once it has received the UL SDMA transmissions from the STA-1 610-1 as well as the selected set of STAs, the STA-2 610-2 and the STA-3 610-3.

As discussed above, obtaining accurate channel state information is a valuable part of the SDMA protocol as spatial streams are formed such that a stream targeted at a particular STA, for example, are seen as low power interference at other STAs. In order to form these non interfering streams, the transmitting node needs to have the CSI from each of the receiving STAs. In one aspect, the transmitting node sends out a request message indicating that the CSI needs to be estimated. The request message is sent to a set of STAs that are potential SDMA transmission recipients. This message is referred to as a Training Request Message (TRM). In the disclosure contained herein, two examples for obtaining CSI at an SDMA transmitter are provided: implicit CSI exchange and explicit CSI exchange.

Figure 8:
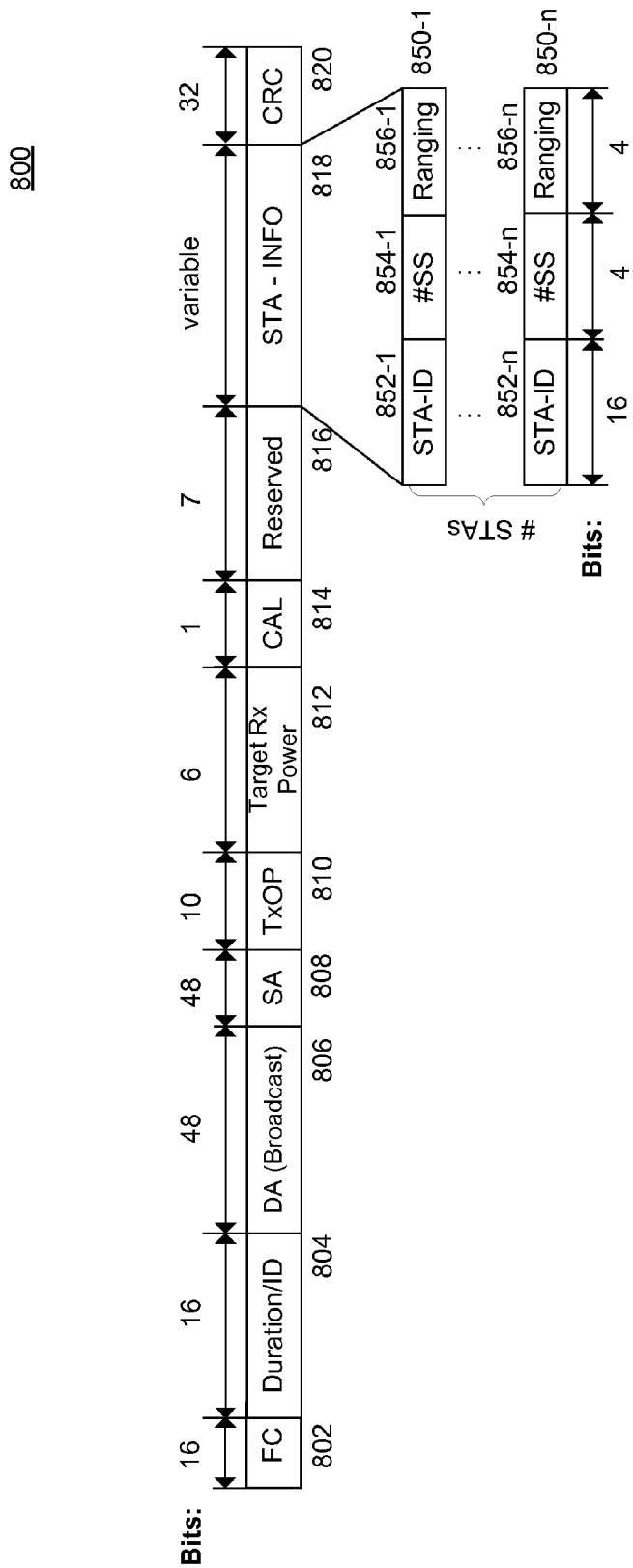
FIG. 8 is a diagram of a TRM frame configured in accordance with one aspect of the disclosure.

An example of the format of the TRM is shown by a TRM 800 in FIG. 8. The data portion of the TRM 800 contains a STA information field 818 that includes the following information:
  (1) STA-ID field Error! Reference source not found.52: Lists the STAs for which the CSI is to be estimated;
  (2) #SS field Error! Reference source not found.54: The number of spatial streams for each STA; and
  (3) Ranging information field 856: Ensure that the sounding symbols arrive time aligned at the AP 110 to ensure accurate joint channel estimate.

The TRM 800 also contains a target Rx Power field 812, which is the Rx power at which an STA's sounding frame should be received at the AP 110. In addition, the TRM 800 also includes a calibration bit 814 that is used for an integrated downlink calibration procedure. Calibration is invoked at relatively large intervals to enable to AP 110 to update correction factors to be applied to the channel estimates.

In one aspect of the disclosure, each TRM such as the TRM 800 is transmitted at a fixed transmit power since the STAs use the transmit power of the TRM to estimate path loss and set transmit power for the uplink sounding frame. The TRM 800 contains the legacy MAC header with the destination address set to the broadcast address in a DA (Broadcast) field 806. The destination address could also be set to a predefined multicast address. The transmission of each TRM is performed using backoff procedures, and in one aspect, the transmission may be performed using the procedures defined in the IEEE 802.11 MAC protocols for contention-based access.

A Duration/ID field 804 in the MAC header is set such that the entire SDMA transmission and the Block ACK reception are accounted for in the distance. In one aspect of the disclosure, each TRM such as the TRM 800 is transmitted at the lowest legacy 802.11a/g rate so the all the STAs (e.g., access terminals 120) in the wireless network 100 can set their NAV appropriately.

Once each of the STAs that are listed in the TRM 800 receives the TRM 800, they each respond with the CSI. In various aspects of the disclosure, multiple approaches may be used to provide an estimate of CSI after a TRM has been transmitted by the SDMA transmitter.

Figure 9:
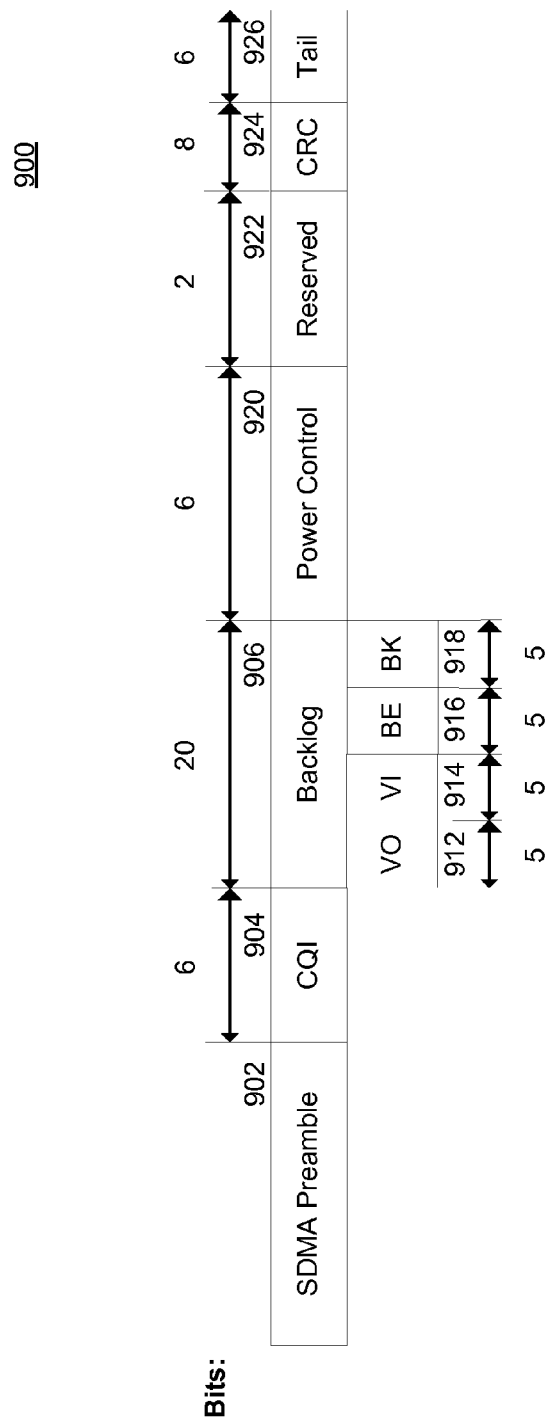
FIG. 9 is a diagram of a sounding frame that includes a SDMA preamble and control information determined by the spatial stream allocation based on the information contained in the TRM frame of FIG. 8.

FIG. 9 illustrates a sounding frame 900 that includes an SDMA preamble portion 902 and a control information portion 904, 906, 920, 922, 924, 926. In one aspect of the disclosure, the length of the SDMA preamble portion 902 is determined by the spatial stream allocation specified in the TRM 800. The control information portion 904, 906, 920, 922, 924, 926 provides the following information:
  (1) Channel Quality Indicator (CQI) field 904: The CQI field 904 contains the per-antenna received SNR averaged across all Rx antennas and tones for a received TRM. This information allows the SDMA transmitter to construct a precoding matrix, if the matrix construction design is based on the MMSE criterion. The information contained in the CQI field 904 also enables the SDMA transmitter to estimate the post detection signal to interference/noise ratio (SINR) and assign appropriate transmission rates for each responding STAs. In one aspect of the disclosure, the CQI can be measured by measuring a level of ambient noise surrounding the receiver during a quiet period;
  (2) Uplink Traffic Backlog field 906: The information contained in the Uplink Traffic Backlog field 906 enables an SDMA transmitter to schedule uplink traffic epochs and/or assign reverse direction grants (RDG). The information contained in the Uplink Traffic Backlog field 906 also facilitates the scheduler creating a tight schedule, thereby optimizing performance of the MAC protocol. In one aspect, the uplink traffic backlog is presented on a per class basis, and VO (voice), VI (video), BE (best effort), and BK (background) fields 912, 914, 916, 918 denote four example priority classes; and
  (3) Power Control field 920: The transmit power information contained in the power control field 920 is filled in by an STA as described herein.

A CRC field 924 for error correction, and a tail field 926 is also included.

Figure 10:
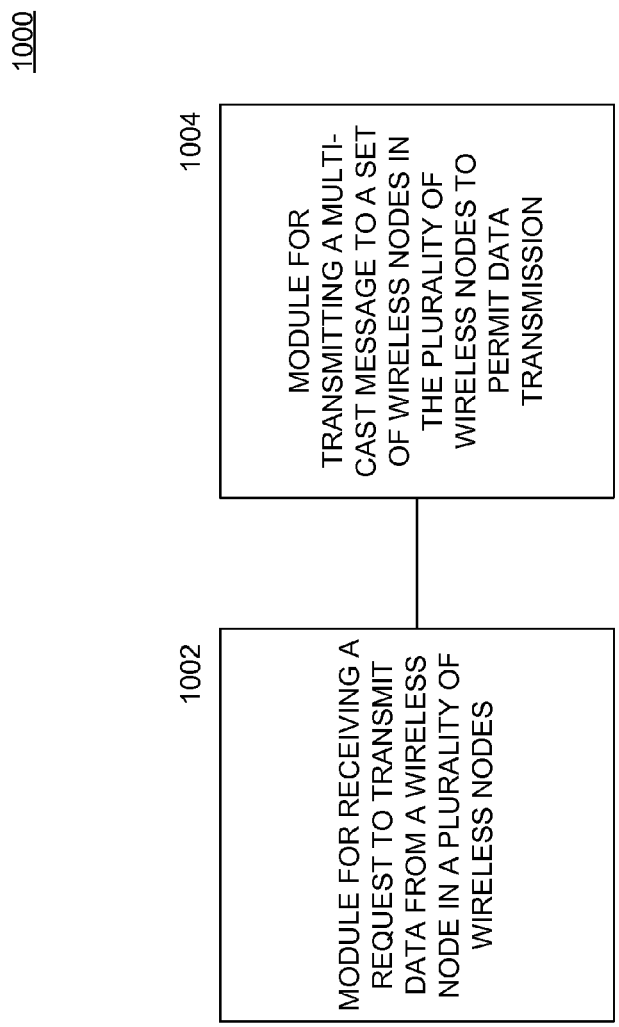
FIG. 10 is a block diagram illustrating the functionality of an access point apparatus for implementing a client-initiated UL scheme with a plurality of STAs in accordance with one aspect of the disclosure.

FIG. 10 is a diagram illustrating the functionality of an access point apparatus 1000 in accordance with one aspect of the disclosure. The apparatus 1000 includes a module 1002 for receiving request to transmit data from a wireless node in a plurality of wireless nodes; and a module 1004 for transmitting a multi-cast message to other wireless nodes in the plurality of wireless nodes to permit data transmission.

FIG. 11 is a diagram illustrating the functionality of an STA apparatus 1100 in accordance with one aspect of the disclosure. The apparatus 1100 includes a module 1102 for contending for access to a medium with a plurality of other wireless nodes; a module 1104 for receiving a multi-cast message permitting data transmission to a set of wireless nodes; and a module 1106 for transmitting data based on the multi-cast message.

Those of skill will appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

By way of example, several aspects of telecommunication systems have been presented with reference to various apparatus and methods. These apparatus and methods have been described herein and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Further by way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The processing system, or any part of the processing system, may provide the means for performing the functions recited herein. By way of example, one or more processing systems executing code may provide the means for receiving a request to transmit data from a wireless node in a plurality of wireless nodes; and transmitting a multi-cast message to a set of wireless nodes in the plurality of wireless nodes to permit data transmission. Alternatively, the code on the computer readable medium may provide the means for performing the functions recited herein.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications comprising:
   receiving, from a first wireless node in a plurality of wireless nodes, a request to transmit data in a transmit opportunity; and
   transmitting a multi-cast message to the plurality of wireless nodes to permit data transmission, wherein the multi-cast message comprises a confirmation to permit data transmission in the transmit opportunity by the first wireless node and indicates parameters for one or more other wireless nodes to transmit data in the transmit opportunity.

2. The method of claim 1, wherein the request is received as part of a medium access contention process.

3. The method of claim 2, wherein the medium access contention process comprises an enhanced distributed channel access (EDCA)-based access contention.

4. The method of claim 1, wherein the confirmation comprises a medium reservation for at least one of the plurality of wireless nodes to perform a transmission operation.

5. The method of claim 1, wherein the confirmation comprises a maximum duration for at least one of the plurality of wireless nodes to perform a transmission operation.

6. The method of claim 1, further comprising choosing the plurality of wireless nodes based on at least one of available communication resources or quality of service (QoS) requirements.

7. The method of claim 1, further comprising transmitting a request for channel training information to the plurality of wireless nodes.

8. The method of claim 7, further comprising receiving the channel training information.

9. The method of claim 1, wherein the multi-cast message comprises at least one of a spatial stream value, a modulation and coding scheme (MCS) value or a power offset value.

10. The method of claim 1, further comprising receiving data transmissions from the first wireless node and at least one of the other wireless nodes.

11. The method of claim 10, further comprising transmitting a block acknowledgment message to the first wireless node and the at least one of the other wireless nodes.

12. The method of claim 10, wherein the received data transmissions were simultaneously transmitted.

13. The method of claim 1, wherein the parameters are indicated for two or more other wireless nodes to transmit data in the transmit opportunity.

14. An apparatus for wireless communications, comprising:
a processing system configured to:
receive, from a first wireless node in a plurality of wireless nodes, a request to transmit data in a transmit opportunity; and
transmit a multi-cast message to the plurality of wireless nodes to permit data transmission, wherein the multi-cast message comprises a confirmation to permit data transmission in the transmit opportunity by the first wireless node and indicates parameters for one or more other wireless nodes to transmit data in the transmit opportunity.

15. The apparatus of claim 14, wherein the request is received as part of a medium access contention process.

16. The apparatus of claim 15, wherein the medium access contention process comprises an enhanced distributed channel access (EDCA)-based access contention.

17. The apparatus of claim 14, wherein the confirmation comprises a medium reservation for at least one wireless of the plurality of wireless nodes to perform a transmission operation.

18. The apparatus of claim 14, wherein the confirmation comprises a maximum duration for at least one of the plurality of wireless nodes to perform a transmission operation.

19. The apparatus of claim 14, wherein the processing system is further configured to choose the plurality of wireless nodes based on at least one of available communication resources or quality of service (QoS) requirements.

20. The apparatus of claim 14, wherein the processing system is further configured to transmit a request for channel training information to the plurality of wireless nodes.

21. The apparatus of claim 20, wherein the processing system is further configured to receive the channel training information.

22. The apparatus of claim 14, wherein the multi-cast message comprises at least one of a spatial stream value, a modulation and coding scheme (MCS) value or a power offset value.

23. The apparatus of claim 14, wherein the processing system is further configured to receive data transmissions from the first wireless node and at least one of the other wireless nodes.

24. The apparatus of claim 23, wherein the processing system is further configured to transmit a block acknowledgment message to the first wireless node and the at least one of the other wireless nodes.

25. The apparatus of claim 23, wherein the received data transmissions were simultaneously transmitted.

26. The apparatus of claim 14, wherein the parameters are indicated for two or more other wireless nodes to transmit data in the transmit opportunity.

27. An apparatus for wireless communications, comprising:
means for receiving, from a first wireless node in a plurality of wireless nodes, in a transmit opportunity; and
means for transmitting a multi-cast message to the plurality of wireless nodes to permit data transmission, wherein the multi-cast message comprises a confirmation to permit data transmission in the transmission opportunity by the first wireless node and indicates parameters for one or more other wireless nodes to transmit data in the transmit opportunity.

28. The apparatus of claim 27, wherein the request is received as part of a medium access contention process.

29. The apparatus of claim 28, wherein the medium access contention process comprises an enhanced distributed channel access (EDCA)-based access contention.

30. The apparatus of claim 27, wherein the confirmation comprises a medium reservation for at least one of the plurality of wireless nodes to perform a transmission operation.

31. The apparatus of claim 27, wherein the confirmation comprises a maximum duration for at least one of set of the plurality of wireless nodes to perform a transmission operation.

32. The apparatus of claim 27, further comprising means for choosing the plurality of wireless nodes based on at least one of available communication resources or quality of service (QoS) requirements.

33. The apparatus of claim 27, further comprising means for transmitting a request for channel training information to the plurality of wireless nodes.

34. The apparatus of claim 33, further comprising means for receiving the channel training information.

35. The apparatus of claim 27, wherein the multi-cast message comprises at least one of a spatial stream value, a modulation and coding scheme (MCS) value or a power offset value.

36. The apparatus of claim 27, further comprising means for receiving data transmissions from the first wireless node and at least one of the other wireless nodes.

37. The apparatus of claim 36, further comprising means for transmitting a block acknowledgment message to the first wireless node and the at least one of the other wireless nodes.

38. The apparatus of claim 36, wherein the received data transmissions were simultaneously transmitted.

39. The apparatus of claim 27, wherein the parameters are indicated for two or more other wireless nodes to transmit data in the transmit opportunity.

40. A computer-program product for wireless communications, comprising:
a non-transitory machine-readable medium comprising instructions executable to:
receive, from a first wireless node in a plurality of wireless nodes, a request to transmit data in a transmit opportunity; and
transmit a multi-cast message to the plurality of wireless nodes to permit data transmission, wherein the multi-cast message comprises a confirmation to permit data transmission in the transmit opportunity by the first wireless node and indicates parameters for one or more other wireless nodes to transmit data in the transmit opportunity.

41. The computer-program product of claim 40, wherein the parameters are indicated for two or more other wireless nodes to transmit data in the transmit opportunity.

42. An access point, comprising:
one or more antennas;
a receiver configured to receive, from a first wireless node in a plurality of wireless nodes via the one or more antennas, a request to transmit data in a transmit opportunity; and
a transmitter configured to transmit a multi-cast message to the plurality of wireless nodes to permit data transmission, wherein the multi-cast message comprises a confirmation to permit data transmission in the transmit opportunity by the first wireless node and indicates parameters for one or more other wireless nodes to transmit data in the transmit opportunity.

43. The access point of claim 42, wherein the parameters are indicated for two or more other wireless nodes to transmit data in the transmit opportunity.

44. A method for wireless communications, comprising:
contending, at a first wireless node in a plurality of wireless nodes, for access to a medium with one or more other wireless nodes in the plurality of wireless nodes;
receiving, at the first wireless node, a multi-cast message permitting data transmission, wherein the multi-cast message comprises a confirmation to permit data transmission by the first wireless node in a transmit opportunity and indicates parameters for the one or more other wireless nodes to transmit data in the transmit opportunity; and
transmitting data in the transmit opportunity based on the multi-cast message.

45. The method of claim 44, further comprising receiving a block acknowledgement based on the transmission of data.

46. The method of claim 45, wherein the multi-cast message comprises a transmission duration time and wherein the method further comprises waiting for the block acknowledgment for a predetermined period of time that is based on the transmission duration time.

47. The method of claim 44, wherein the parameters are indicated for two or more other wireless nodes to transmit data in the transmit opportunity.

48. An apparatus for wireless communications, comprising:
a processing system configured to:
contend, at the apparatus in a plurality of wireless node, for access to a medium with one or more other wireless nodes in the plurality of wireless nodes;
receive a multi-cast message permitting data transmission, wherein the multi-cast message comprises a confirmation to permit data transmission by the apparatus in a transmit opportunity and indicates parameters for the one or more other wireless nodes to transmit data in the transmit opportunity; and
transmit data in the transmit opportunity based on the multi-cast message.

49. The apparatus of claim 48, wherein the processing system is further configured to receive a block acknowledgement based on the transmission of data.

50. The apparatus of claim 49, wherein the multi-cast message comprises a transmission duration time and wherein the processing system is further configured to wait for the block acknowledgment for a predetermined period of time that is based on the transmission duration time.

51. The apparatus of claim 48, wherein the parameters are indicated for two or more other wireless nodes to transmit data in the transmit opportunity.

52. An apparatus for wireless communications, comprising:
means for contending, at the apparatus in a plurality of wireless nodes, for access to a medium with one or more other wireless nodes in the plurality of wireless nodes;
means for receiving a multi-cast message permitting data transmission, wherein the multi-cast message comprises a confirmation to permit data transmission by the apparatus in a transmit opportunity and indicates parameters for the one or more other wireless nodes to transmit data in the transmit opportunity; and
means for transmitting data in the transmit opportunity based on the multi-cast message.

53. The apparatus of claim 52, wherein the parameters are indicated for two or more other wireless nodes to transmit data in the transmit opportunity.

54. A computer-program product for wireless communications, comprising:
a non-transitory machine-readable medium comprising instructions executable to:
contend, at a first wireless node in a plurality of wireless nodes, for access to a medium with one or more other wireless nodes;
receive, at the first wireless node, a multi-cast message permitting data transmission, wherein the multi-cast message comprises a confirmation to permit data transmission by the first wireless node in a transmit opportunity and indicates parameters for the one or more other wireless nodes to transmit data in the transmit opportunity; and
transmit data in the transmit opportunity based on the multi-cast message.

55. The computer-program product of claim 54, wherein the parameters are indicated for two or more other wireless nodes to transmit data in the transmit opportunity.

56. A station, comprising:
at least one antenna;
a processor configured to contend, at the station belonging to a plurality of wireless nodes, for access to a medium with one or more other wireless nodes;
a receiver configured to receive, via the at least one antenna, a multi-cast message permitting data transmission, wherein the multi-cast message comprises a confirmation to permit data transmission by the station in a transmit opportunity and indicates parameters for the one or more other wireless nodes to transmit data in the transmit opportunity; and
a transmitter configured to transmit, via the at least one antenna, data in the transmit opportunity based on the multi-cast message.

57. The station of claim 56, wherein the parameters are indicated for two or more other wireless nodes to transmit data in the transmit opportunity.

* * * * *